US 10,512,815 B2
Dec. 24, 2019

United States Patent
Stilson

(54) CLAMPING DEVICE

(71) Applicant: Tyler Scott Stilson, Frederick, CO (US)

(72) Inventor: Tyler Scott Stilson, Frederick, CO (US)

(73) Assignee: Coulter Ventures, LLC, Columbus, OH (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/860,089

(22) Filed: Jan. 2, 2018

(65) Prior Publication Data

US 2018/0185696 A1    Jul. 5, 2018

Related U.S. Application Data

(63) Continuation of application No. 14/943,024, filed on Nov. 16, 2015, now Pat. No. 9,855,458.

(Continued)

(51) Int. Cl.
  *F16B 2/18*    (2006.01)
  *A63B 21/072*    (2006.01)

(52) U.S. Cl.
  CPC ...... *A63B 21/0728* (2013.01); *A63B 21/0724* (2013.01); *F16B 2/185* (2013.01)

(58) Field of Classification Search
  CPC .......... A63B 21/0004; A63B 21/00058; A63B 21/00069; A63B 21/00072; A63B 21/02;
  (Continued)

(56) References Cited

U.S. PATENT DOCUMENTS 2,244,351 A * 6/1941 Venables ............ A63B 21/0728
                                                              403/344
3,305,234 A * 2/1967 Cline ................. A63B 21/0728
                                                              24/270

(Continued)

FOREIGN PATENT DOCUMENTS

GB          685710 A   *  1/1953   ......... A63B 21/0728
WO     2015134826 A2     9/2015

(Continued)

OTHER PUBLICATIONS

Product listing for Muscle Clamps from https://www.roguefitness.com/muscle-clamps, dated Sep. 19, 2018, product known to be available as of Nov. 13, 2014.

(Continued)

*Primary Examiner* — Gary D Urbiel Goldner
(74) *Attorney, Agent, or Firm* — The Watson IP Group, PLC; Jovan N. Jovanovic

(57) ABSTRACT

A clamping device is configured for securely engaging one or more objects through application of pressure. The clamping device includes a primary member having opposed interior and exterior surfaces. The primary member has a generally cylindrical shape such that the interior surface defines a generally circular space about a center point of the primary member. The clamping device can receive an elongated member through the generally circular space circumscribed by the primary member. The primary member is adapted for clamping and releasing. The clamping device further incorporates one or more components for releasably engaging the elongated member, such as a lever, attached to the primary member and moveable between a closed position, where the elongated member is securely retained by the clamping device through the application of pressure, and an (Continued)

open position, where the clamping device is removable from the elongated member.

17 Claims, 7 Drawing Sheets

Related U.S. Application Data

(60) Provisional application No. 62/080,168, filed on Nov. 14, 2014.

(58) Field of Classification Search
CPC ... A63B 21/023; A63B 21/025; A63B 21/026; A63B 21/04; A63B 21/0407; A63B 21/0414; A63B 21/0421; A63B 21/0428; A63B 21/0435; A63B 21/0442; A63B 21/045; A63B 21/0455; A63B 21/05; A63B 21/055; A63B 21/0552; A63B 21/0555; A63B 21/0557; A63B 21/06; A63B 21/072; A63B 21/0722; A63B 21/0724; A63B 21/0726; A63B 21/0728; A63B 21/075; A63B 21/08; A63B 21/15; A63B 21/151; A63B 21/159; A63B 21/4023; A63B 21/4027; A63B 21/4033; A63B 21/4035; A63B 21/4043; A63B 21/4045; A63B 21/4047; A63B 21/4049; A63B 71/0054; A63B 2071/0063; A63B 2071/0072; A63B 2071/0081; A63B 2071/009; A63B 2209/14; A63B 2225/09; A63B 2244/09; Y10T 24/1412; Y10T 24/1424; Y10T 24/1418; Y10T 24/142; F16B 2/185; F16B 2/18

See application file for complete search history.

(56) References Cited

U.S. PATENT DOCUMENTS

| | | | | | |
|---|---|---|---|---|---|
| 4,569,105 | A | * | 2/1986 | Weider | A63B 21/0728 24/544 |
| 4,639,979 | A | * | 2/1987 | Polson | A63B 21/0728 24/273 |
| 5,062,631 | A | * | 11/1991 | Dau | A63B 21/0728 403/330 |
| 5,295,933 | A | * | 3/1994 | Ciminski | A63B 21/0728 24/270 |
| 5,591,109 | A | * | 1/1997 | Strnad | A63B 21/0728 24/524 |
| 7,789,814 | B1 | * | 9/2010 | Xu | A63B 21/0728 482/107 |
| 8,142,335 | B1 | * | 3/2012 | Leach | A63B 21/0728 482/107 |
| D694,841 | S | * | 12/2013 | Ciminski | D21/681 |
| 8,827,878 | B1 | * | 9/2014 | Ciminski | A63B 21/0728 482/107 |
| D764,608 | S | * | 8/2016 | Jones | D21/694 |
| D766,384 | S | * | 9/2016 | Jones | D21/694 |
| 9,855,458 | B2 | * | 1/2018 | Stilson | A63B 21/0728 |
| 10,226,659 | B2 | * | 3/2019 | Stilson | A63B 21/0728 |
| 2008/0287271 | A1 | * | 11/2008 | Jones | A63B 21/0728 482/107 |
| 2011/0162173 | A1 | * | 7/2011 | Ciminski | A63B 21/0728 24/303 |
| 2013/0072359 | A1 | * | 3/2013 | Leach | A63B 21/0004 482/107 |
| 2013/0196830 | A1 | * | 8/2013 | Pfitzer | A63B 21/0602 482/110 |
| 2014/0121075 | A1 | * | 5/2014 | Brown | A63B 21/026 482/106 |
| 2014/0162855 | A1 | * | 6/2014 | Beckman | A63B 21/0728 482/139 |
| 2014/0200119 | A1 | * | 7/2014 | Sides, Jr. | A63B 21/0618 482/106 |
| 2014/0287889 | A1 | * | 9/2014 | Grace | A63B 21/0728 482/106 |
| 2015/0231441 | A1 | * | 8/2015 | Davies, III | A63B 21/0728 482/107 |
| 2016/0025121 | A1 | * | 1/2016 | Ahnert | B25B 5/08 16/421 |
| 2017/0095688 | A1 | * | 4/2017 | Stilson | A63B 21/0728 |
| 2017/0144012 | A1 | * | 5/2017 | Stilson | A63B 21/0728 |
| 2018/0326251 | A1 | * | 11/2018 | Stilson | A63B 21/0728 |

FOREIGN PATENT DOCUMENTS

| | | | |
|---|---|---|---|
| WO | WO 2015134826 A2 * | 9/2015 | A63B 21/0724 |
| WO | 2017046731 A1 | 3/2017 | |

OTHER PUBLICATIONS

Product listing for Rogue Proloc Collars from https://www.roguefitness.com/rogue-proloc-collars, dated Sep. 19, 2018, product known to be available as of Nov. 13, 2014.

Product listing for Rogue Spring Collars from https://www.roguefitness.com/spring-collars, dated Sep. 19, 2018, product known to be available as of Nov. 13, 2014.

Product listing for Rogue HG Collars from https://web.archive.org/web/20141007093507/http://www.roguefitness.com/rogue-hg-collars, dated Oct. 7, 2014.

Product listing for Rogue Proloc Blocker from https://www.roguefitness.com/proloc-blocker, dated Sep. 19, 2018, product known to be available as of Nov. 13, 2014.

Product listing for Rogue Proloc 2 Chain Collars from https://www.roguefitness.com/rogue-proloc-2-collars-pair, dated Sep. 19, 2018, product known to be available as of Nov. 13, 2014 .

Product listing for Rogue Metal HG Collars from https://web.archive.org/web/20151012215636/http://www.roguefitness.com:80/rogue-metal-hg-collars, dated Oct. 12, 2015.

Product listing for Eleiko International Collars from https://www.ebay.co.uk/itm/Eleiko-Olympic-Weight-Lifting-Training-Collars-Clips-IWF-IPF-approved-Commercial-/112533462103, dated Sep. 19, 2018, product known to be available as of Nov. 13, 2014.

Product listing for Eleiko Competition Collars from https://web.archive.org/web/20120228055629/http://www.roguefitness.com:80/eleiko-collars.php, dated Feb. 28, 2012.

Product listing for Ader Spring Collars from https://web.archive.org/web/20131119152405/http://www.roguefitness.com:80/ader-spring-collars.php, dated Nov. 19, 2013.

Product listing for Rogue Metal Axle Collars from https://web.archive.org/web/20141010232044/http://www.roguefitness.com:80/rogue-metal-axle-collars, dated Oct. 10, 2014 .

Product listing for Uesaka Sevi Competition Collars from https://web.archive.org/web/20151118052603/http://www.roguefitness.com:80/uesaka-sevi-competition-collars, dated Nov. 18, 2015, product known to be available as of Nov. 15, 2015.

Product listing for Rogue Proloc Collars Red from https://www.roguefitness.com/rogue-proloc-collars-red, dated Sep. 19, 2018, product known to be available as of Nov. 13, 2014.

Product listing showing Strongman Specialty Barbell Spring Clamp from https://web.archive.org/web/20120223160336/https://www.roguefitness.com/rogue-farmers-walk-handles.php, dated Feb. 23, 2012.

Web page https://web.archive.org/web/20151113160442/http://www.roguefitness.com:80/weightlifting-bars-plates/collars, dated Nov. 13, 2015.

Web page https://web.archive.org/web/20141007081926/http://www.roguefitness.com/weightlifting-bars-plates/collars, dated Oct. 7, 2014.

Web Page https://web.archive.org/web/20150826081003/http://www.roguefitness.com:80/weightlifting-bars-plates/collars, dated Aug. 26, 2015.

* cited by examiner

CLAMPING DEVICE

CROSS-REFERENCE TO RELATED APPLICATION

This application claims the benefit of U.S. Provisional Patent Application Ser. No. 62/080,168, filed on Nov. 14, 2014.

BACKGROUND OF THE INVENTION

1. Field of the Invention

The present invention relates generally to clamping devices. More particularly, the present invention relates to devise used to secure weights on exercise equipment.

2. Description of the Related Art

A clamping device is an apparatus that engages one or more objects for the purpose of securely retaining the object or objects. Design considerations for clamping devices include overall size, weight, number of component parts, means for joining component parts, quality of feedstock, likelihood of improper use, ability to prevent movement and separation when engaging multiple objects, propensity to become deformed or break through use, and means for engaging and releasing the device.

These design considerations will affect whether a clamping device is able to function reliable and in what circumstances. It is possible for more than one of the identified considerations to impact a single design feature. Typically, clamping devices take a limited umber of the above design factors into consideration.

Thus, a clamping device capable of reliably engaging one or more objects securely may be too large or heavy for the intended use. Alternatively, such a clamping device may sacrifice ease of use for reliability. Providing for of additional tools can increase the ability of a clamping device to securely engage an object, while making the device more difficult to use. Ease of use can also influence whether a clamping device is regularly used or adopted by potential users.

Another potential tradeoff is a reduction in the quality of feedstock to reduce production cost. Clamping devices constructed at least in part from inexpensive or substandard material can degrade through both use and the passage of time.

It is also desired that the clamping device not damage an engaged object or objects. A clamping device that allows a user to determine the distance between the points of contact between the device and a target object can be over tightened, increasing the possibility of damage to the object. Also, if a contact surface of a clamping device is made of coarse materials it is more likely to damage a retained object. The likelihood that damage will occur with such a device is increased if it is used during high impact activities.

Clamping devices are commonly used during weight training to reduce conditions that restrict performance of an exercise or the ability to perform an exercise in a safe manner. Undesirable conditions include instability, imbalance, oscillation of movable parts, and separation of removable components from assemblies, equipment or apparatuses. These conditions pose a safety risk due to potential injuries.

To limit these undesirable conditions, a clamping device is favored that is able remain securely engaged throughout the entire movement required of an exercise. It is also desirable for the clamping device to remain securely engaged throughout all successive repetitions of the exercise.

A common training assembly used during weight training is a barbell with removable weights loaded on in it. A clamping device can be employed to prohibit separation of the removable weights of that assembly. Additionally, a clamping device that can securely engage the barbell is desirable to prevent movement of the weights while on the barbell.

Moreover, removable weights often incorporate a sleeve positioned around their inside surface that contacts the exterior surface of the barbell. Clamping devices used to retain the weights on the barbell can damage the sleeve if the surface area that contacts the weight is insignificant due to the thickness of the clamping device.

Clamping devices which attempt to address more than one of the identified problems are often difficult to manufacture. More difficult still to manufacture such clamping devices economically. Thus, a clamping device that solves more than one of the aforementioned problems is desired.

SUMMARY OF THE INVENTION

A clamping device is disclosed for securely engaging one or more objects through the application of pressure. The clamping device includes a primary member having opposed interior and exterior surfaces. The primary member has a generally cylindrical shape such that the interior surface defines a generally circular space about the center point of the primary member. The clamping device can receive an elongated member through the generally circular space circumscribed by the primary member.

The clamping device is adapted for clamping and releasing and incorporates a means for releasably engaging the elongated member. The means for releasably engaging the elongated member has opposed open and closed positions. The means for releasably engaging the elongated member is attached to the primary member such that when the means for releasably engaging the elongated member is in the closed position, the elongated member is securely engaged by the clamping devices through the application of pressure.

BRIEF DESCRIPTION OF THE DRAWINGS

Similar reference characters denote corresponding features consistently throughout the attached drawings.

DETAILED DESCRIPTION OF THE PREFERRED EMBODIMENTS

Figure 1:
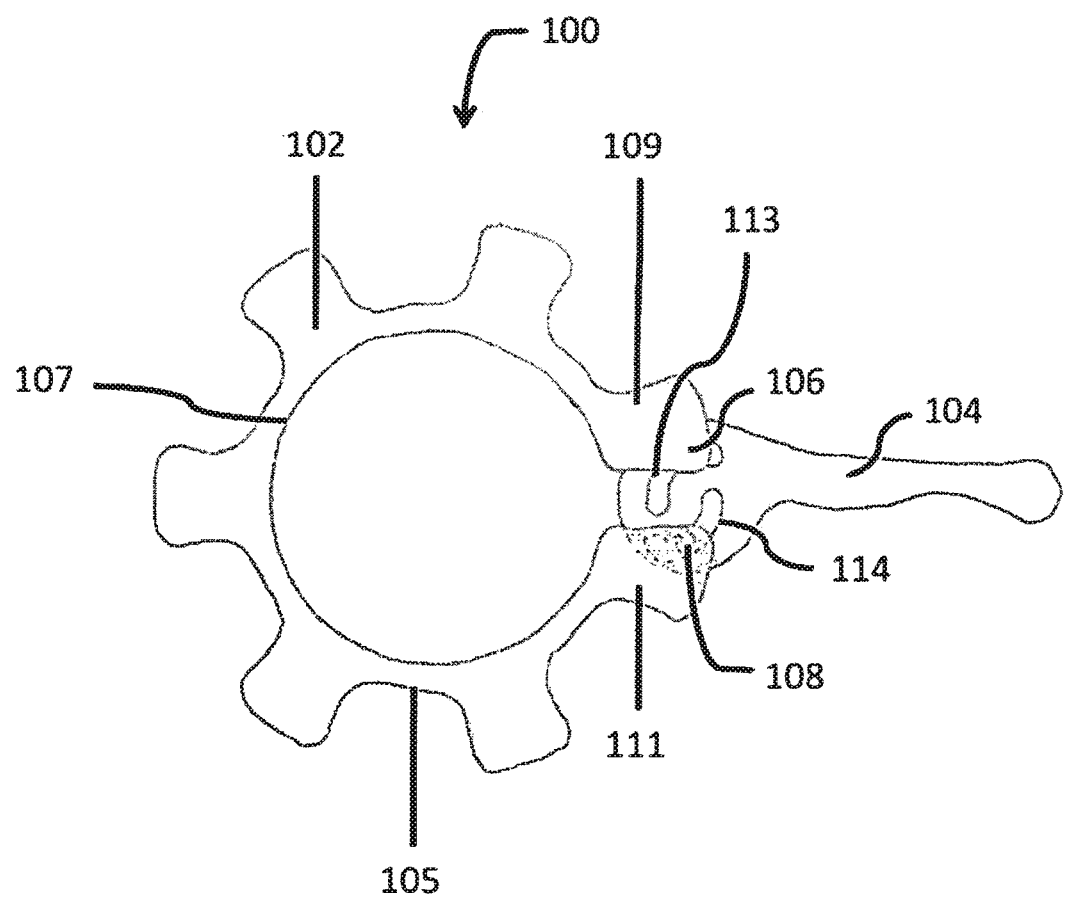
FIG. 1 is an end view of an exemplary embodiment of the invention in the opened position.
Figure 2:
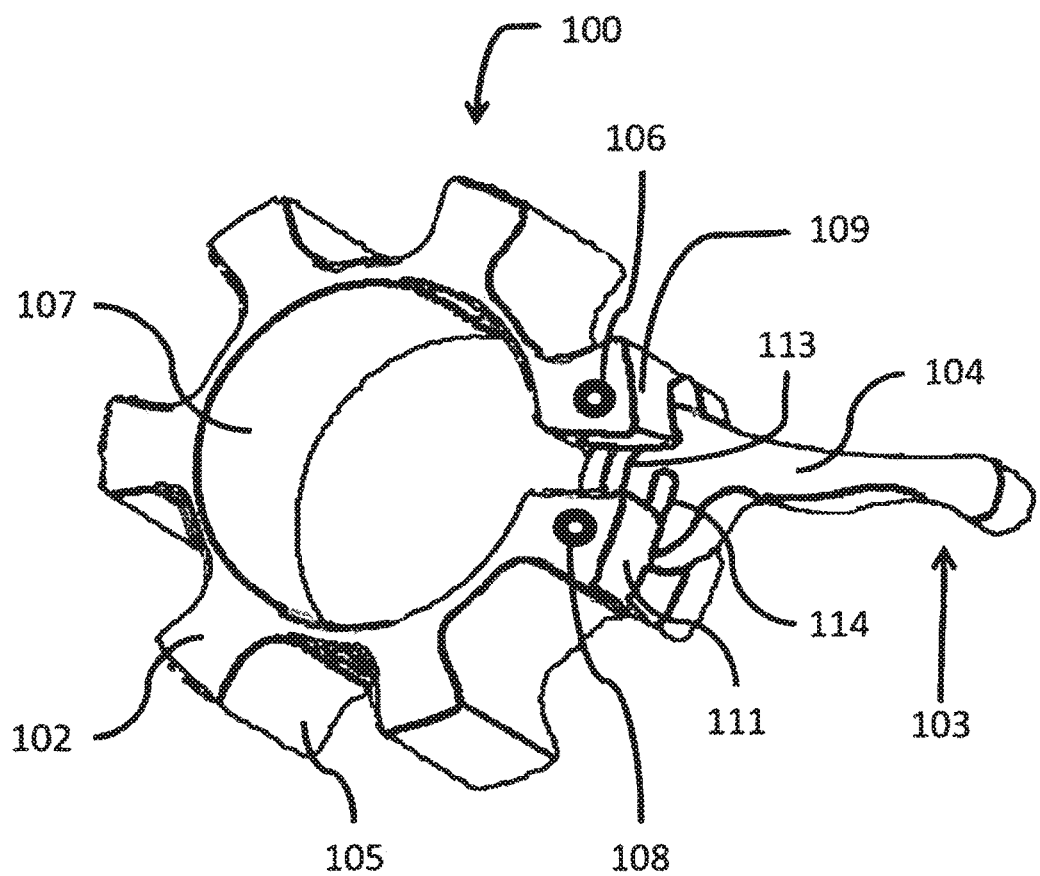
FIG. 2 is perspective view of an exemplary embodiment of the invention in the opened position.

In various exemplary embodiments, the present invention relates to a clamping device 100. As shown in the exemplary embodiment in FIG. 3, the clamping device 100 securely retains one or more objects through the application of force. A perspective view of one embodiment of the clamping device is shown in FIG. 2. As illustrated in FIG. 2, the clamping device 100 is shown with a primary member 102 that is generally cylindrical. The primary member 102 is one continual piece throughout its length. The primary member 102 having an interior surface 107 and an opposed exterior surface 108. The interior and exterior surfaces 107, 108 follow a generally circular path about the center of the primary member 102.

Figure 7:
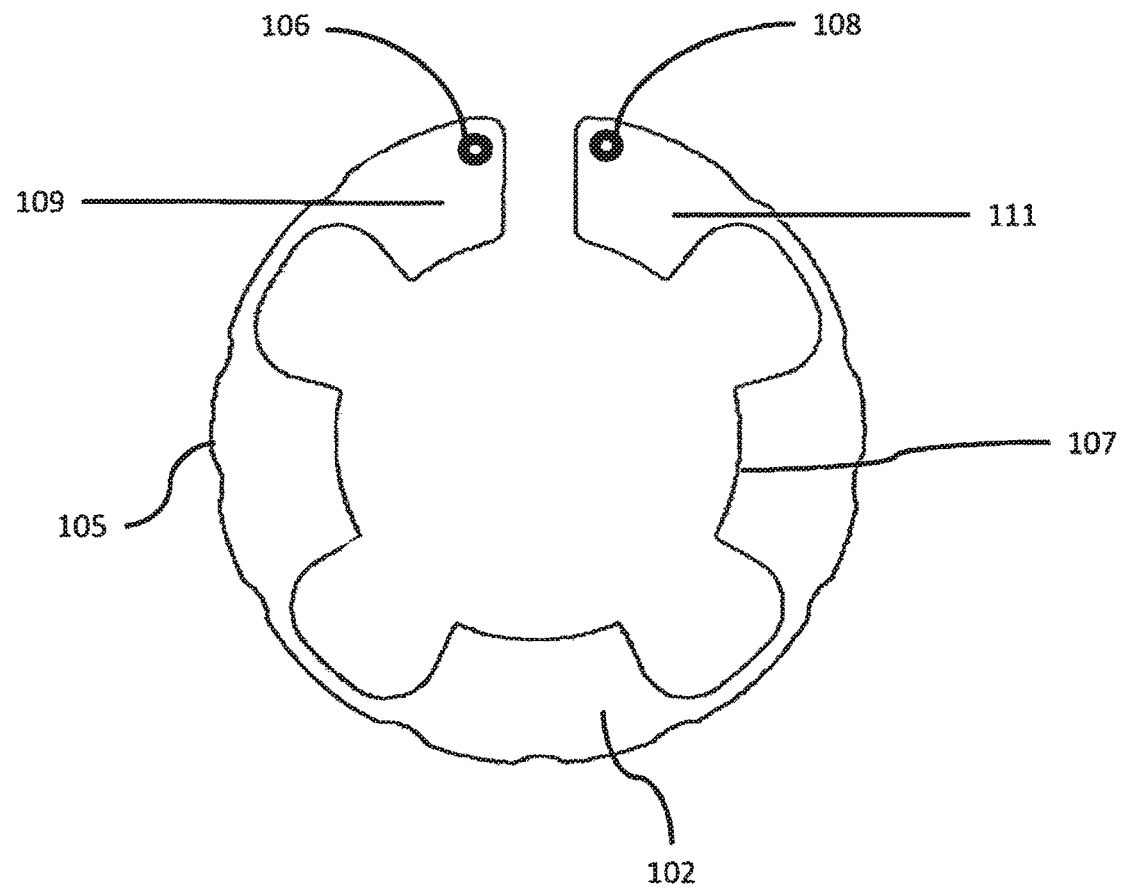
FIG. 7 is an end view of another exemplary embodiment of the invention.

In the particular embodiment shown in FIG. 2, the exterior surface 108 follows a generally parabolic path when the clamping device 100 is observed from an end view. The pattern displayed by the exterior surface 108 in this embodiment is optional. Other potential patterns include those that are substantially triangular or crescent when viewing the clamping device 100 from an end view. FIG. 7 shows the exterior surface 105 remaining generally circular around the circumference of the primary member 102. The opposed interior surface 107 moving closer and further away from the exterior surface 105 as the interior and exterior surfaces 107, 105 move in a generally circular direction about the center of the primary element 102.

FIG. 2 further shows the primary member 102 with two extremities 109, 111. The primary member being sufficiently rigid to bias the first extremity 109 away from the second extremity 111. The two extremities 109, 111 being sufficiently distant from each other 109, 111 to allow one or more objects to pass through the center of the primary member 102 (not shown). An elongated member being one such potential object. The clamping device 100 having a means for releasably engaging 104 such elongated member. In this particular embodiment, each of the two extremities 190, 111 is joined to the means for releasably engaging the elongated member 104. Further, in this embodiment, the means for releasably engaging the elongated member is a lever 104. The level 104 is a preferred means for releasably engaging the elongated member, but not required.

FIG. 2 further shows the lever 104 in the open position 103. Lever 104 will cause the clamping device 100 to engage the elongated member by transitioning from the open position 103 to the closed position 115. In this embodiment, pins 106, 108 are vertically oriented parallel to the interior and exterior surfaces 107, 105. Each pin 106, 108 extends the height of one extremity 109, 111. The pins 106, 108 join the lever 104 to each extremity 109, 111 by extending vertically through counterposed arcuate holes 106, 108 formed through the lower end of the lever 104.

Figure 3:
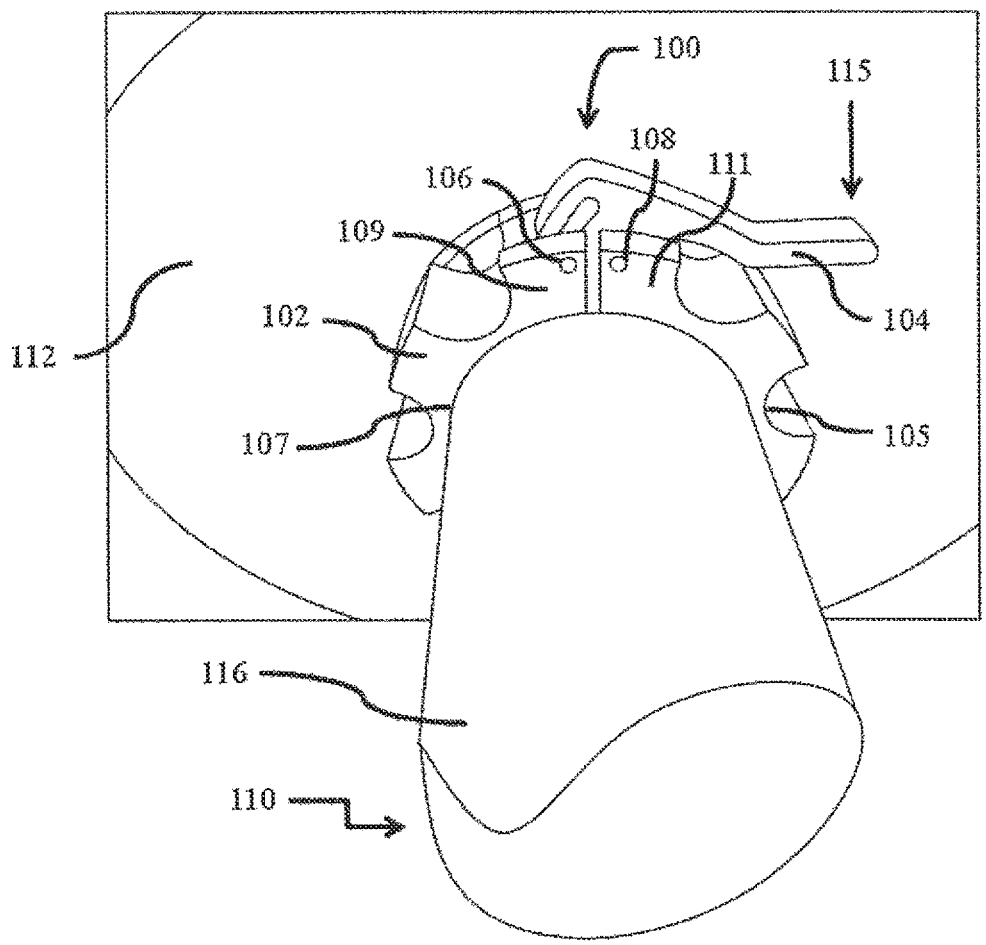
FIG. 3 is a perspective view of an exemplary embodiment of the invention in the closed position.

FIG. 2 further shoes lever 104 pivots radially about the midpoint of the pins 106, 108 approximately ninety degrees to transition from the open position 103 to the closed position 115. FIG. 3 shows lever 104 causing the clamping device 100 to engage a barbell by being positioned in the closed position 115. In this embodiment, lever 104 decreases the circumference and diameter of the primary member 102 simultaneously when transitioning from the open position 103 to the closed position 115. FIG. 3 further shows clamping device 100 protecting sleeve positioned around their inside surface of the weight that contacts the exterior surface of the barbell by radially extending from the center of the barbell higher that the interior surface of the weight.

Figure 4:
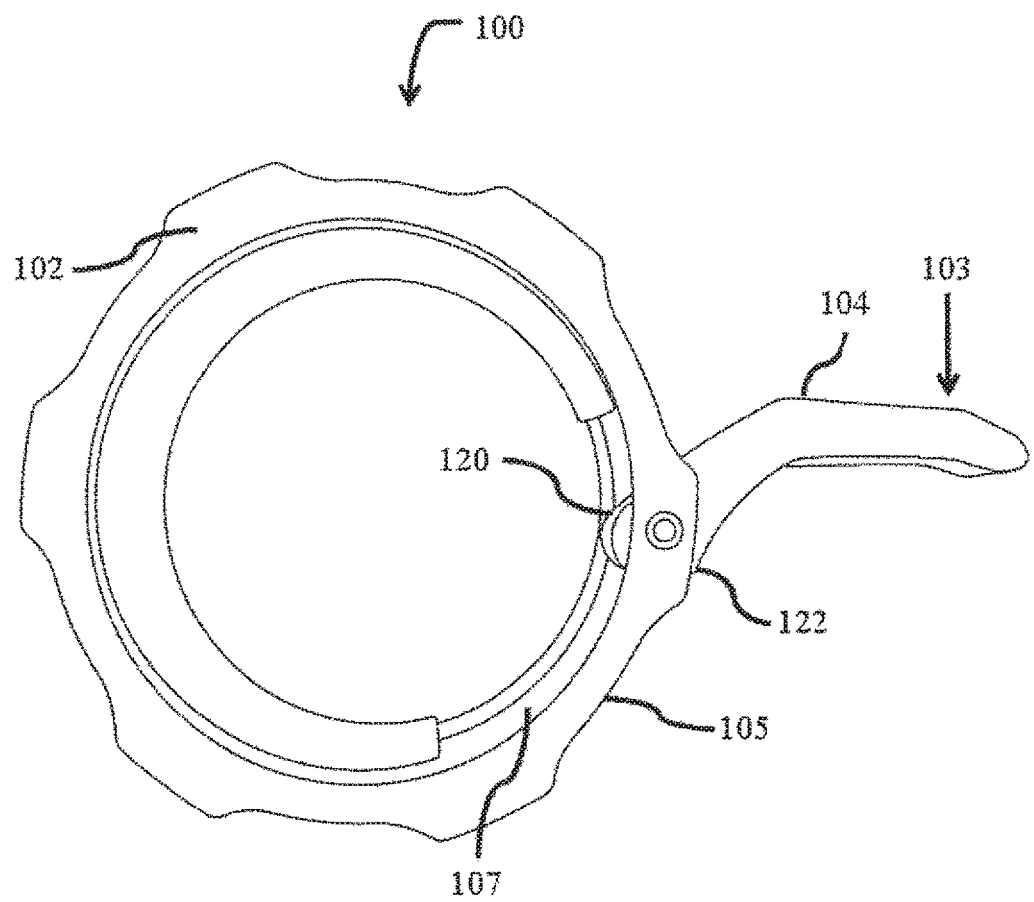
FIG. 4 is a perspective view of another exemplary embodiment of the invention in the open position.
Figure 5:
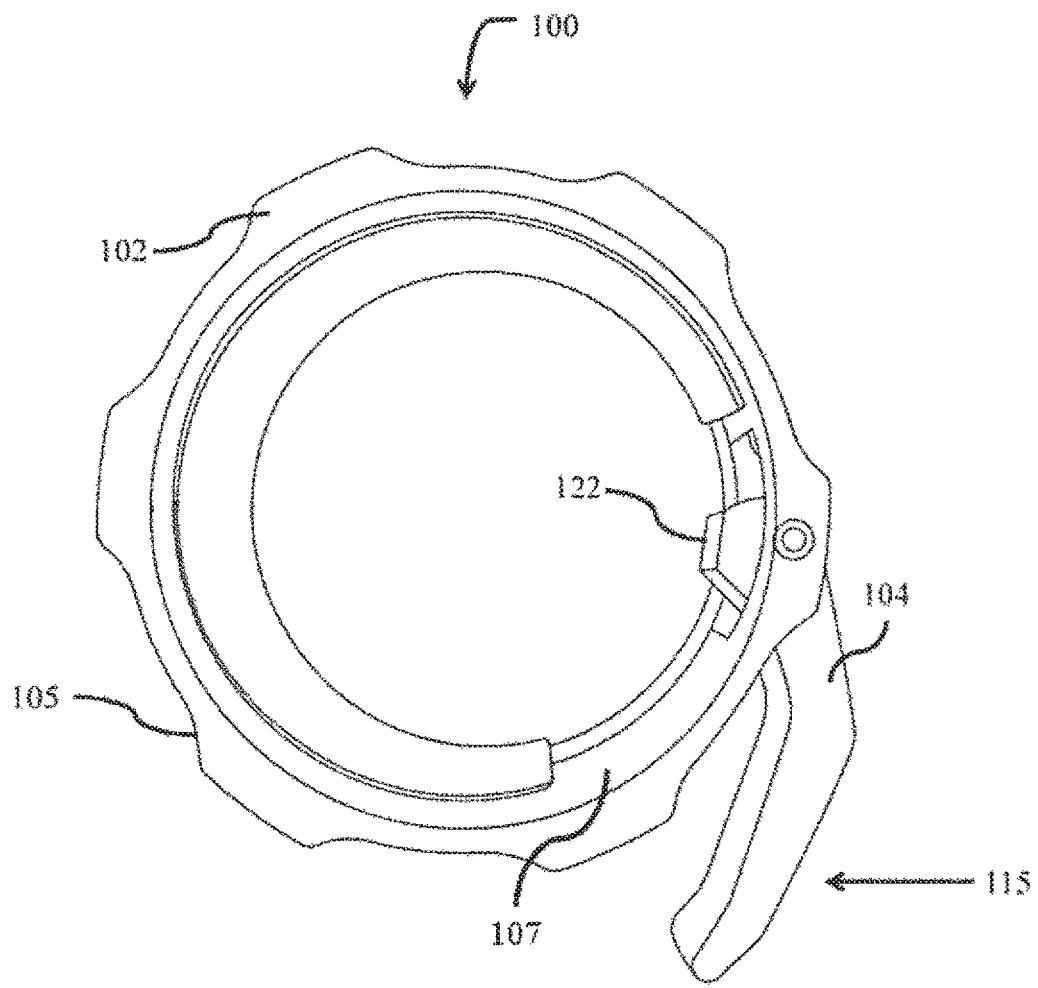
FIG. 5 is a perspective view of an exemplary embodiment of the invention in the closed position.
Figure 6:
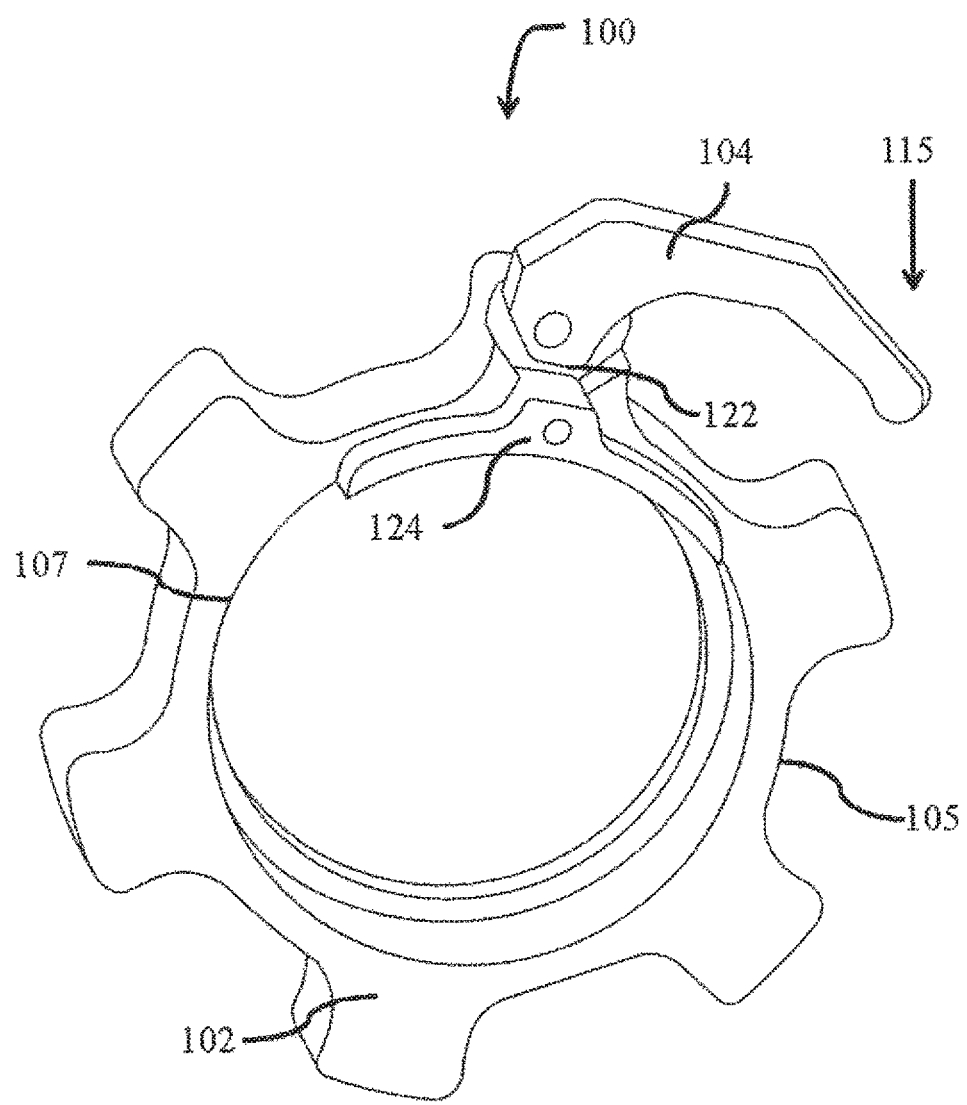
FIG. 6 is a perspective view of another exemplary embodiment of the invention in the opened position.

FIGS. 4 and 5 show another exemplary embodiment of the clamping device 100 where the means for releasably engaging the elongated member 104 having an upper end 120 and a lower end 122 such that when said means for releasably engaging the elongated member 104 is in the closed position 115 the lower end thereof 122 extends below the interior surface 107 of said primary member 102 to contact the elongated member. FIG. 4 shows the means for releasably engaging the elongated member 104 in the open position 114. FIG. 6 show another exemplary embodiment of the clamping device 100 where lower end 122 of means to releasably engage the elongated member 104 depresses an engaging agent 124.

The clamping device 100 can be created using multiple types of feedstock, that is to say the main raw material used in the manufacture of a product. In one exemplary embodiment, the clamping device 100 is made from an aluminum alloy (not indicated). In a preferred embodiment, the aluminum alloy 6061 Billet, formerly referred to as Alloy 61S. Other preferred materials for construction of the clamping device 100 include plastics (not indicated) and steel (not indicated). It is also possible to use different materials to construct different component parts of the clamping device 100.

The preferred embodiment easily and quickly engages the exercise equipment. The preferred embodiment is also able to easily and quickly disengaged from the exercise equipment to allow for weights to be conveniently removed or added to the exercise equipment.

It should be understood that the invention is not limited in its application to the details of the particular arrangement shown here since the invention is capable of other embodiments, some of which may be quite different from those of the disclosed embodiments. While the foregoing written description of the invention enables one of ordinary skill in the art to make and use what is presently considered by the inventor to be the best mode of the invention, a device may be practiced which incorporates other structural and/or functional details in addition to or other than the structural and/or functional details set forth herein. It should therefore be understood that the present invention is not limited to the embodiments described above, but encompasses any and all embodiments within the scope and spirit of the invention as claimed.

I claim:

1. A clamping device for a cylindrical member, comprising:
    a primary member having an interior surface and an exterior surface opposite the interior surface, the interior surface defining a generally cylindrical opening extending from a first side to a second side of the primary member, the second side being opposite the first side, the primary member including a slot extending from the interior surface through the exterior surface and defining a first extremity and a second extremity which are spaced apart from each other, the generally cylindrical opening defining a central axis extending through the first and second sides of the primary member,
    a first circumferential slot defined in the first extremity, the first circumferential slot positioned between the first side and the second side, and parallel thereto;
    a second circumferential slot defined in the second extremity, the second circumferential slot positioned between the first side and the second side, and parallel thereto, and corresponding to the first circumferential slot;
    a first pin extending through the first circumferential slot and perpendicular thereto, and a second pin extending through the second circumferential slot and perpendicular thereto; and a lever having a proximal end and a distal end, a first arcuate hole and a second arcuate hole each defined in the lever at the proximal end thereof, the proximal end of the lever extending into the first circumferential slot and the second circumferential slot, with the first pin extending through the first arcuate hole and the second pin extending through the second arcuate hole, the lever being rotatably positioned within the first circumferential slot and the second circumferential slot, with the first pin slidably movable relative to the first arcuate hole and the second pin slidably movable relative to the second arcuate hole;

wherein the lever is rotatable relative to the primary member within the first circumferential slot and the second circumferential slot between an open position and a closed position to put pressure against the cylindrical member, wherein rotation from the open position to the closed position directs the first extremity and the second extremity toward each other, reducing a spacing therebetween, and wherein rotation from the closed position to the open position allows for increasing the spacing between the first extremity and the second extremity.

2. The clamping device of claim 1 wherein the exterior surface comprises a plurality of lugs extending radially outwardly, defining a valley respectively therebetween, each of the plurality of lugs being spaced apart from each other and defining an axial outer surface, the axial outer surface of each of the plurality of lugs being substantially concentric with the inner surface.

3. The clamping device of claim 2 wherein the first circumferential slot and the second circumferential slot are each formed in a same one of the plurality of lugs.

4. The clamping device of claim 3 wherein the first extremity includes a first opening extending from the first side to the second side and through the first circumferential slot, with the first pin extending through the first opening, and wherein the second extremity includes a second opening extending from the first side to the second side and through the second circumferential slot, with the second pin extending through the second opening.

5. The clamping device of claim 4 wherein the primary member is substantially symmetrical about a plane bisecting the slot between the first extremity and the second extremity and extending through the central axis of the generally cylindrical opening.

6. The clamping device of claim 2 wherein a radial outward distance between the interior surface and the exterior surface at the plurality of lugs defines a first outer thickness of the primary member and wherein the radial outward distance between the interior surface and the exterior surface at each respective valley defines a second outer thickness, with the first outer thickness being greater than the second outer thickness.

7. The clamping device of claim 1 wherein the lever remains outside of the generally cylindrical opening between the open position and the closed position.

8. The clamping device of claim 7 wherein the lever travels approximately one quarter rotation between the open position and the closed position.

9. The clamping device of claim 1 wherein the first arcuate hole is outwardly convex relative to the first circumferential slot and the second arcuate hole is outwardly convex relative to the second circumferential slot.

10. The clamping device of claim 1 wherein an axis of rotation of the lever between the open position and the closed position is in the slot between the first extremity and the second extremity.

11. The clamping device of claim 10 wherein the axis of rotation of the lever is between the first arcuate hole and the second arcuate hole.

12. The clamping device of claim 1 wherein the lever comprises a single integrally formed member.

13. The clamping device of claim 12 wherein the single integrally formed member has a substantially uniform thickness, with opposing sides that are substantially parallel to each other.

14. The clamping device of claim 1 wherein in the closed position, the distal end of the lever is spaced apart from the exterior surface of the primary member.

15. The clamping device of claim 1 wherein the primary member comprises a single integrally formed member.

16. The clamping device of claim 1 further including a liner disposed along the interior surface of the primary member.

17. The clamping device of claim 1 wherein the interior surface of the primary member is structurally configured to extend about an outer surface of a barbell.

* * * * *